United States Patent
Krins et al.

(10) Patent No.: US 9,822,298 B2
(45) Date of Patent: Nov. 21, 2017

(54) METHOD FOR TREATING A SUBTERRANEAN FORMATION

(71) Applicant: API INSTITUTE, Emmen (NL)

(72) Inventors: Bastiaan Krins, Emmen (NL); Jeroen Van Der Vlist, Eelde (NL); Onno Lint, Beuningen (NL)

(73) Assignee: SENBIS POLYMER INNOVATIONS B.V., Emmen (NL)

( * ) Notice: Subject to any disclaimer, the term of this patent is extended or adjusted under 35 U.S.C. 154(b) by 0 days.

(21) Appl. No.: 15/027,656

(22) PCT Filed: Oct. 10, 2014

(86) PCT No.: PCT/EP2014/071711
§ 371 (c)(1),
(2) Date: Apr. 6, 2016

(87) PCT Pub. No.: WO2015/055516
PCT Pub. Date: Apr. 23, 2015

(65) Prior Publication Data
US 2016/0257871 A1    Sep. 8, 2016

(30) Foreign Application Priority Data

Oct. 16, 2013  (EP) .................................... 13188982

(51) Int. Cl.
| | |
|---|---|
| *E21B 43/267* | (2006.01) |
| *C09K 8/62* | (2006.01) |
| *C09K 8/70* | (2006.01) |
| *C09K 8/72* | (2006.01) |
| *C08G 63/08* | (2006.01) |
| *C08L 67/04* | (2006.01) |
| *C09K 8/80* | (2006.01) |
| *E21B 43/26* | (2006.01) |

(52) U.S. Cl.
CPC ................. *C09K 8/62* (2013.01); *C08G 63/08* (2013.01); *C08L 67/04* (2013.01); *C09K 8/70* (2013.01); *C09K 8/72* (2013.01); *C09K 8/80* (2013.01); *E21B 43/26* (2013.01); *E21B 43/267* (2013.01); *C09K 2208/08* (2013.01)

(58) Field of Classification Search
CPC ....... E21B 43/267; E21B 43/26; C09K 8/665; C09K 8/80; C09K 8/68; C09K 8/805; C09K 8/62
See application file for complete search history.

(56) References Cited

U.S. PATENT DOCUMENTS

| 8,490,700 B2 | 7/2013 | Lesko et al. |
| 2011/0114313 A1 | 5/2011 | Lesko et al. |
| 2011/0192605 A1 | 8/2011 | Wann |

FOREIGN PATENT DOCUMENTS

| WO | 2004/038176 A1 | 5/2004 |
| WO | 2013/147796 A1 | 10/2013 |

OTHER PUBLICATIONS

Oct. 30, 2014 International Search Report issued in International Patent Application No. PCTEP2014/071711.
Oct. 30, 2014 Written Opinion of the International Searching Authority issued in International Patent Application No. PCT/EP2014/071711.

*Primary Examiner* — Zakiya W Bates
(74) *Attorney, Agent, or Firm* — Oliff PLC

(57) ABSTRACT

A method of treating a subterranean formation at temperatures of at least 150° C., the method includes introducing a pressurized fracturing liquid including proppants and solid channelants to create fractures in the subterranean formation, wherein the channelants include (PLA) solids derived from a blend of poly L-lactic acid (PLLA) and poly D-lactic acid (PDLA).

12 Claims, No Drawings

METHOD FOR TREATING A SUBTERRANEAN FORMATION

BACKGROUND

The disclosed embodiments relate to the stimulation of wells penetrating subterranean formations, and more specifically to fracture stimulation by injection of proppant into a fracture to form regions of low resistance to flow through the fracture for the production of hydrocarbons. More particularly, the disclosed embodiments pertain to a method of treating a subterranean formation at temperatures of at least 150° C. by a pressurized fracturing liquid comprising solid proppants and solid channelants to create fractures in the subterranean formation. Such a method is also known as "hydraulic fracturing" and is—generally speaking—the fracturing of rock by a pressurized liquid (the fracturing fluid).

US 2011/0114313 A1 describes a fracturing treatment which includes the injection of a proppant and a channelant that can act as a fill to physically separate the proppant clusters at appropriate distances during placement in the fracture. For the channelant, polymers can be used, including polylactic acid.

WO 2004/038176 A1 describes an acid fracturing method in which the acid is generated in the fracture by hydrolysis of a solid acid precursor which, for example, is polylactic acid. The fracturing liquid further contains a proppant.

WO 2013/147796 A1 describes a method which comprises injecting a proppant and a removable channelant in a hydraulic fracture operation. The channelant may be polylactic acid, for example, shaped as fibers.

US 2011/0192605 A1 describes a degradable polymer composition which includes at least one degradable polymer. In a certain embodiment said at least one degradable polymer includes (1) from about 20 to about 80 mole percent monomer residues of a first monomer selected from the group consisting of L-lactic acid, D-lactic acid, L-lactide, D-lactide, and glycolic acid; (2) from about 20 to about 80 mole percent monomer residues of a second monomer, which is different from the first monomer, selected from the group consisting of L-lactic acid, D-lactic acid, L-lactide, D-lactide and glycolic acid; and (3) from about 0.001 to about 32 mole percent monomer residues of at least one compound which is capable of reacting with either the first or the second monomer to from an ester.

Various further methods are known for fracturing a subterranean formation to enhance the production of fluids therefrom. In the typical application, the fracturing fluid hydraulically creates and propagates a fracture. The fracturing fluid carries the proppant particulates into the extending fracture. When the fracturing fluid is removed, the fracture does not completely close from the loss of hydraulic pressure; instead, the fracture remains propped open by the packed proppant, allowing fluids to flow from the subterranean formation through the proppant pack to the production wellbore.

A method as described above is known from, for example, U.S. Pat. No. 8,490,700 B2, which discloses a fracturing treatment including the injection of both proppant and a removable material that can act as a filler. The proppant and removable material are disposed within a fracture in such a way that the removable material is segregated from the proppant to act as a temporary filler material compressed in the fracture in spaces between clusters or islands of proppant, which form pillars to hold open the fracture. Then, the fill material is removed to form open channels for unimpeded fluid flow through the fracture in the spaces left around the proppant pillars. Hereinforth, the removable, channel-forming fill material is referred to as "channelant."

The proppant can be sand, nut hulls, ceramics, bauxites, glass, and the like, and combinations thereof. Also, other proppants, like plastic beads such as styrene divinylbenzene, and particulate metals, are used. Other proppants may be materials such as drill cuttings that are circulated out of the well. Essentially, the proppant can be any material that will hold open the propped portion of the fracture. Typically, the channelant will be removed to form open channels around the pillars for fluid flow from the formation through the fracture toward the wellbore.

The channelant can be any material that is degradable or dissolvable after placement within the fracture. More specifically and in its simplest form, the channelant contains solid particulates that can be maintained in solid form during injection and fracture closure. The channelant can be, for example, polylactic acid (PLA), polyglycolic acid (PGA), polyol, polyethylene terephthalate (PET), polysaccharide, wax, salt, calcium carbonate, benzoic acid, naphthalene based materials, magnesium oxide, sodium bicarbonate, soluble resins, sodium chloride, calcium chloride, ammonium sulfate, and the like, or a combination thereof. The channelant can be in the form of spheres, rods, platelets, ribbons, and the like, and combinations thereof. The channelant can include or consist of fibers. The fibers can be, for example, glass, ceramics, carbon, carbon-based compounds, metal, metallic alloys, or the like, or a combination thereof, or a polymeric material such as PLA, PGA, PET, polyol, or the like, or a combination thereof.

Removal of the channelant may be influenced by such factors as invasion of formation fluids, exposure to water, passage of time, the presence of incipient or delayed reactants in or mixed with the channelant particles, post-injection introduction of an activating fluid, and the like, or any combination of thereof.

A preferred channelant applied in various fracturing processes and thus fracturing fluids or liquid is—as already mentioned above—polylactic acid (PLA). PLA is available in huge quantities; the PLA polymers are solids at room temperature and are hydrolyzed by water to form lactic acid. Those readily available in the market typically have crystalline melt temperatures of from about 120 to about 185° C.

The advantage of PLA solids to be used as channelant lies in the fact that they can be removed easily by hydrolysis reactions.

The rates of such hydrolysis reactions are governed, among other factors, by the molecular weight, the crystallinity (the ratio of crystalline to amorphous material), the physical form (size and shape of the solid), and in the case of polylactide, the amounts of the two optical isomers. The naturally occurring L-lactide forms partially crystalline polymers; synthetic D,L-lactide forms amorphous polymers. Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

While on the one hand the above-mentioned properties of PLA polymer—in particular the favorable degradability—for use as a channelant are desired, on the other hand exactly these properties become problematic when fracturing processes in deeper subterranean formations are envisaged. Since temperature and pressure increase drastically the deeper the fracturing process is applied, both the proppants and channelants need to be more heat resistant as depth increases.

While the proppants are usually heat resistant per se, if the channelants are made of a thermoplastic polymer, for example, the melting temperature of the channelants must be adapted to ensure that the solid consistency is retained under increased temperature and pressure, at least until the (polymeric) channelants have fulfilled their task in the fracturing process. Presently, standard PLA is being used up to a temperature of 150° C. At higher temperatures, PLA will temporarily remain solid, but it will lose its solid consistency due to hydrolysis after a too short period of time. Above 150° C., an alternative for standard PLA must be found.

In the case of channelants made from polylactic acid, the increase of the melting temperature, and thus of the temperature range wherein the PLA polymer remains solid, can be achieved by the steps of mixing poly(L-lactic acid) comprising an L-Lactic acid unit and poly(D-lactic acid) comprising a D-lactic acid unit in solution or in a molten stage to obtain a stereocomplex polylactic acid (sc-PLA) that exhibits a melting temperature in the range of about 200 to about 230° C.

In case of fibrous PLA, which are applied frequently, the conventional methods for forming a stereocomplex fiber include stretching and heat fixing an amorphous unstretched yarn obtained by melt spinning a blend of poly(L-lactic acid)—also referred as to "PLLA"—and poly(D-lactic acid)—also referred as to "PDLA"—which is based on the principle that it is efficient to heat fix a fiber at a temperature higher than the melting point of poly(D-lactic acid) or poly(L-lactic acid) single crystals in order to sufficiently grow stereocomplex.

A stereocomplex of PDLA and PLLA has a higher melting point than polylactic acid that has not undergone such treatment.

While stereocomplex PLA is resistant enough to remain solid even at temperatures higher than 185° C., the necessary heat fixing makes the sc-PLA more expensive and thus reduces the economic attractiveness of the use of hydraulic fracturing in deeper subterranean formations. The heat fixing is done in a separate step because of the residence time needed for the formation of the sc-PLA crystals.

SUMMARY

In one aspect, the disclosed embodiments seek to reduce this problem.

Surprisingly, it has been discovered that the problem can be solved when the channelants in the fracturing liquid are prepared using PLA solids derived from a blend of poly L-lactic acid (PLLA) and poly D-lactic acid (PDLA).

Therefore, the disclosed embodiments provide a method of treating a subterranean formation at temperatures of at least 150° C. by a pressurized fracturing liquid comprising proppants and solid channelants to create fractures in the subterranean formation, and the method is characterized in that the fracturing liquid is prepared using channelants which comprise polylactic acid (PLA) solids derived from a blend of poly L-lactic acid (PLLA) and poly D-lactic acid (PDLA).

DETAILED DESCRIPTION OF EMBODIMENTS

In the process according to the disclosed embodiments, the fracturing liquid is prepared using channelants which comprise polylactic acid (PLA) solids derived from a blend of poly L-lactic acid (PLLA) and poly D-lactic acid (PDLA) acid.

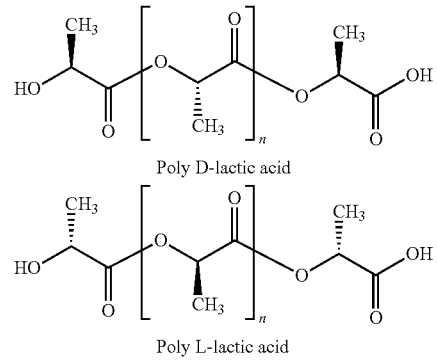

Poly D-lactic acid

Poly L-lactic acid

The lower formula shown above represents poly L-lactic acid. The hydrogen atom at the asymmetric carbon atom is not shown. In poly L-lactic acid the polymer chain exclusively contains L-lactides. So, poly L-lactic acid is a polymer which consists of 100% L-lactide monomer residues.

The upper formula shown above represents poly D-lactic acid. Again, the hydrogen atom at the asymmetric carbon atom is not shown. In poly D-lactic acid the polymer chain exclusively contains D-lactides. So, poly D-lactic acid is a polymer which consists of 100% D-lactide monomer residues.

Therefore, polylactic acid (PLA) solids derived from a blend of poly L-lactic acid (PLLA) and poly D-lactic acid (PDLA) significantly differ from the lactic acid based polymers of the prior art described in the Background section which:
either merely describe poly lactic acid without any information regarding the stereochemical composition; or
describe a polymer which includes:
(1) from about 20 to about 80 mole percent monomer residues of a first monomer selected from the group consisting of L-lactic acid, D-lactic acid, L-lactide, D-lactide, and glycolic acid;
(2) from about 20 to about 80 mole percent monomer residues of a second monomer, which is different from the first monomer, selected from the group consisting of L-lactic acid, D-lactic acid, L-lactide, D-lactide, and glycolic acid; and
(3) from about 0.001 to about 32 mole percent monomer residues of at least one compound which is capable of reacting with either the first or the second monomer to from an ester.

Thus, in the process according to the disclosed embodiments, PLA solids as defined above that have a melting temperature below the operating temperature of the fracturing process are used, but the PLA remains stable and solid. Alternatively, in the process according to the disclosed embodiments, PLA solids as defined above are used in a fracturing process at an operation temperature below the melting temperature of the PLA solids, where PLA would not be expected to stay stable for a period of time sufficient to fulfill its task. The PLA solids as defined above retain their capability to work as channelants and are hydrolyzed at a later stage.

In the process according to the disclosed embodiments, a weight ratio of the PLLA and PDLA in the blend of PLLA and PDLA preferably is in the range of 30:70 to 70:30, more preferably in the range of 40:60 to 60:40, and most preferably in the range of 45:55 to 55:45.

In a further preferred embodiment, the proppants are selected from the group consisting of sand, nut hulls, ceramics, bauxites, glass, plastic beads such as styrene divinylbenzene, particulate metals and/or combinations thereof.

In a further preferred embodiment, the poly L-lactic acid (PLLA) exhibits a melting temperature $T_m$(PLLA) and the poly D-lactic acid (PDLA) exhibits a melting temperature $T_m$(PDLA), and both $T_m$(PLLA) and $T_m$(PDLA) are in the range of 120 to about 185° C.

In the process according to the disclosed embodiments, the PLA solids, i.e. the solids derived from a blend of poly L-lactic acid (PLLA) and poly D-lactic (acid (PDLA), are preferably fibers.

In a further preferred embodiment, the fibers exhibit a fiber titer of the range from 1 to 10 dtex, preferably in the range of 2 to 3 dtex.

In a further preferred embodiment, the fibers are short fibers.

In a further preferred embodiment, the short fibers exhibit a length in the range from 1 to 25 mm, preferably from 3 to 6 mm.

In a further preferred embodiment, the channelants consist of PLA fibers derived from a blend of poly L-lactic acid (PLLA) and poly D-lactic acid (PDLA), wherein the poly L-lactic acid (PLLA) exhibits a melting temperature $T_m$(PLLA) and the poly D-lactic acid (PDLA) exhibits a melting temperature $T_m$(PDLA), and both $T_m$(PLLA) and $T_m$(PDLA) are in the range of 120 to about 185° C. In this preferred embodiment, the PLA fibers are the only channelant within the fracturing liquid.

Remarkably and unexpectedly, a blend of "standard" poly L-lactic acid and poly D-lactic acid can be applied, although it would be expected to be rendered molten and/or degraded under the process conditions during fracturing, due to the presence of hot pressurized water at temperatures close to or exceeding the melting temperature of poly L-lactic acid (PLLA) and poly D-lactic acid (PDLA) in the blend.

This renders deep formation fracturing much cheaper, as PLA solids can be applied without any after-treatment, such as heat-setting, before being introduced in the process.

In the preferred embodiment, wherein the PLA solids are fibers or a yarn, the heat treatment of the fibers or the yarn can be omitted. This allows for the production of the fibers or the yarn in a single step spin-draw-winding machine. This offers a great economic advantage.

Without being bound to any theory, applicant assumes that under the conditions in deeper subterranean formations and at the higher temperature, a heat-setting is achieved "in situ," rendering any of the other methods to increase the thermal stability of PLA redundant.

It is possible to further extend the lifetime of the PLA solids by addition of an endcapper, like BioAdimide™ 100 from Rhein Chemie.

The disclosed embodiments will be further elucidated by virtue of the following examples that are meant for illustration only and should not be construed to limit the invention by any means.

Example 1

2 kg of PLLA (Poly L-lactic acid) resin chips and 2 kg of PDLA (poly D-lactic acid) resin chips were mixed and dried for 12 hours at 100° C. under reduced pressure. This resin mixture was fed to a single screw melt spin-line and was operated at a take-up speed of 293 meters/minute and a throughput of 1.2 kg/hour. The extruder zone temperatures and spinneret block temperature were set as listed below.

Zone 1: 200° C.
Zone 2: 210° C.
Zone 3: 220° C.
Zone 4: 225° C.
Spinneret block: 240° C.

The spinneret consisted of 72 holes with a diameter of 250 μm, and a multifilament yarn was spun with a linear density of 510 dtex (72f510).

The as-spun yarn was subsequently drawn in a separate process equipped with a hot pin (70° C.), a 3 meter length oven (120° C.), 3 godets, and a winding station. The first draw step was applied over the hot pin between godets 1 and 2 (draw ratio 2.5). The second draw step was between godets 2 and 3 (in the oven), resulting in an overall draw ratio of 5.5 and a take-up speed of 27.5 meters/minute.

As proved with X-ray diffraction (XRD equator scan), only one diffraction pattern was present—associated with homo-crystals (hc), i.e., with crystals consisting of PLLA and with crystals consisting of PDLA. There were no reflexes present that could be assigned to stereo complex (sc) crystals. The drawn yarn was subsequently subjected to a heat treatment of 10 seconds at a temperature of 185° C. with a yarn tension <10 cN. This yarn was subjected to XRD analysis as well and showed a characteristic sc-crystal diffraction pattern. Moreover, the reflexes characteristic for hc-crystals were absent.

In order to determine the hydrolysis resistance of the produced scPLA yarn at elevated temperatures, a yarn sample was charged in a Parr bomb with 10 ml demi water. The Parr bomb was placed in a preheated oven at 204° C. for 1.75 hours. Afterwards, the yarn was visually judged on dimension and shape, and it appeared that the yarn kept its original dimensions and shape.

Example 2

2 kg of PLLA (Poly L-lactic acid) resin chips and 2 kg of PDLA (poly D-lactic acid) resin chips were mixed and dried for 12 hours at 100° C. under reduced pressure. This resin mixture was fed to a single screw melt spin-line and was operated at a take-up speed of 293 meters/minute and a throughput of 1.2 kg/hour. The extruder zone temperatures and spinneret block temperature were set as listed below.

Zone 1: 200° C.
Zone 2: 210° C.
Zone 3: 220° C.
Zone 4: 225° C.
Spinneret block: 240° C.

The spinneret consisted of 72 holes with a diameter of 250 μm and a multifilament yarn was spun with a linear density of 510 dtex (72f510).

The as-spun yarn was subsequently drawn in a separate process at a custom made draw-frame equipped with a hot pin (70° C.), a 3 meter length oven (120° C.), 3 godets, and a winding station. The first draw step was applied over the hot pin between godets 1 and 2 (draw ratio 2.5). The second draw step was between godets 2 and 3 (in the oven), resulting in an overall draw ratio of 5.5 and a take-up speed of 27.5 meter/minute.

As proved with X-ray diffraction (XRD equator scan), only one diffraction pattern was present—associated with homo-crystals (hc), i.e., with crystals consisting of PLLA and with crystals consisting of PDLA. There were no reflexes present that could be assigned to stereo complex (sc) crystals.

In order to determine the hydrolysis resistance of the produced scPLA yarn at elevated temperatures, a yarn sample was charged in a Parr bomb with 10 ml demi water. The Parr bomb was placed in a preheated oven at 204° C. for 1.75 hours. Afterwards, the yarn was visually judged on dimension and shape, and it appeared that the yarn kept its original dimensions and shape. XRD analysis showed that during the hydrolysis test sc-crystals were grown into the yarn as a characteristic diffraction pattern associated with sc-crystals was observed.

The invention claimed is:

1. A method of treating a subterranean formation at temperatures of at least 150° C., the method comprising:
    introducing a pressurized fracturing liquid into the subterranean formation, the fracturing liquid comprising proppants and solid channelants to create fractures in the subterranean formation,
    wherein the channelants comprise polylactic acid (PLA) solids derived from a blend of poly L-lactic acid (PLLA), which is a polymer that consists of L-lactide monomer residues, and poly D-lactic acid (PDLA), which is a polymer that consists of D-lactide monomer residues.

2. The method according to claim 1, wherein a weight ratio of the PLLA and the PDLA in the blend of PLLA and PDLA is in a range of 30:70 to 70:30.

3. The method according to claim 2, wherein the weight ratio of the PLLA and the PDLA in the blend of PLLA and PDLA is in a range of 40:60 to 60:40.

4. The method according to claim 1, wherein the proppants are selected from the group consisting of sand, nut hulls, ceramics, bauxites, glass, plastic beads such as styrene divinylbenzene, particulate metals and/or combinations thereof.

5. The method according to claim 1, wherein a melting temperature Tm(PLLA) of the poly L-lactic acid (PLLA) and a melting temperature Tm(PDLA) of the poly D-lactic acid (PDLA) are each in a range of 120 to about 185° C.

6. The method according to claim 1, wherein the PLA solids are fibers.

7. The method according to claim 6, wherein a fiber titer of the fibers is in a range from 1 to 10 dtex.

8. The method according to claim 6, wherein the fibers are short fibers.

9. The method according to claim 8, wherein a length of the short fibers is in a range from 1 to 25 mm.

10. The method according to claim 1, wherein:
    the channelants comprise PLA fibers derived from a blend of poly L-lactic acid (PLLA) and poly D-lactic acid (PDLA); and
    a melting temperature Tm(PLLA) of the poly L-lactic acid (PLLA) and a melting temperature Tm(PDLA) of the poly D-lactic acid (PDLA) are each in a range of 120 to about 185° C.

11. The method according to claim 1, wherein the polylactic acid (PLA) solids comprise homo-crystals of poly L-lactic acid (PLLA) and homo-crystals of poly D-lactic acid (PDLA).

12. The method according to claim 1, wherein the polylactic acid (PLA) solids do not include stereocomplex crystals of poly L-lactic acid (PLLA) and poly D-lactic acid (PDLA).

* * * * *